(12) United States Patent
Marshall

(10) Patent No.: US 10,492,376 B2
(45) Date of Patent: Dec. 3, 2019

(54) TOP FEEDING WICKING APPARATUS AND SYSTEM

(71) Applicant: 4D Holdings LLC, Studio City, CA (US)

(72) Inventor: Aaron Marshall, Valley Village, CA (US)

( * ) Notice: Subject to any disclaimer, the term of this patent is extended or adjusted under 35 U.S.C. 154(b) by 0 days.

(21) Appl. No.: 15/563,948

(22) PCT Filed: Jan. 27, 2017

(86) PCT No.: PCT/US2017/015228
§ 371 (c)(1),
(2) Date: Oct. 2, 2017

(87) PCT Pub. No.: WO2017/136227
PCT Pub. Date: Aug. 10, 2017

(65) Prior Publication Data
US 2018/0125015 A1 May 10, 2018

Related U.S. Application Data

(60) Provisional application No. 62/289,678, filed on Feb. 1, 2016.

(51) Int. Cl.
*A01G 13/02* (2006.01)
*A01G 9/02* (2018.01)
*A01G 27/04* (2006.01)

(52) U.S. Cl.
CPC ........... *A01G 9/02* (2013.01); *A01G 13/0281* (2013.01); *A01G 27/04* (2013.01)

(58) Field of Classification Search
CPC .............. A01G 13/0281; A01G 27/006; A01G 27/008; A01G 29/00; A01G 13/0237; A01G 13/0243; A01G 13/0268; A01G 13/02
See application file for complete search history.

(56) References Cited

U.S. PATENT DOCUMENTS

| | | | | |
|---|---|---|---|---|
| 4,087,938 A | * | 5/1978 | Koch | A01G 29/00 239/200 |
| 4,336,666 A | * | 6/1982 | Caso | A01G 27/006 47/21.1 |

(Continued)

*Primary Examiner* — Thanh Pham
(74) *Attorney, Agent, or Firm* — Elizabeth Yang

(57) ABSTRACT

A top feeding wicking apparatus and system for dispersing liquid through plant growing medium is disclosed. The apparatus includes a geometrically shaped container having a bottom, an inner wall, and an outer wall forming a channel therearound for receiving liquid therethrough. Container has a center opening for receiving a plant and container bottom is configured with at least one hole for receiving liquid therethrough. A geometrically shaped lid having a top, an inner wall, and an outer wall forming a channel therearound from an underside of lid is configured to be adjoined to container. A geometrically shaped base layer and wicking layer each having an inner wall and an outer wall and a center opening for receiving plant with a longitudinal opening extending therefrom to outer wall to allow placement of base and wicking layers on plant or to allow removal of base and wicking layers from plant. Container with lid is configured to set atop base layer and wicking layer such that liquid is dispersed through plant growing medium.

20 Claims, 8 Drawing Sheets

(56) References Cited

U.S. PATENT DOCUMENTS

| | | | | |
|---|---|---|---|---|
| 5,325,627 A * | 7/1994 | Anderson | ........... | A01G 13/0281 |
| | | | | 206/423 |
| 5,355,623 A * | 10/1994 | Brown | ............... | A01G 13/0281 |
| | | | | 47/32 |
| 6,195,935 B1 * | 3/2001 | Bellucci | ............. | A01G 13/0281 |
| | | | | 47/9 |
| 2003/0182852 A1 * | 10/2003 | Clancey | ............. | A01G 13/0281 |
| | | | | 47/32 |
| 2005/0108932 A1 * | 5/2005 | Hsia | .................. | A01G 13/0281 |
| | | | | 47/32 |
| 2006/0064929 A1 * | 3/2006 | Allen | ..................... | A01G 29/00 |
| | | | | 47/48.5 |
| 2008/0072481 A1 * | 3/2008 | Conrad | ............. | A01G 13/0281 |
| | | | | 47/31.1 |
| 2008/0256855 A1 * | 10/2008 | Helmy | .................. | A01G 13/0281 |
| | | | | 47/33 |
| 2014/0173981 A1 * | 6/2014 | Ichikawa | ................ | B32B 5/022 |
| | | | | 47/58.1 R |
| 2015/0257341 A1 * | 9/2015 | Alt | ........................... | A47G 7/08 |
| | | | | 428/36.91 |
| 2015/0282442 A1 * | 10/2015 | Marshall | ................ | A01G 27/00 |
| | | | | 47/79 |
| 2016/0374277 A1 * | 12/2016 | Lortscher | .................. | B32B 5/26 |
| | | | | 47/48.5 |

* cited by examiner

TOP FEEDING WICKING APPARATUS AND SYSTEM

CROSS-REFERENCE TO RELATED APPLICATIONS

This application claims the benefit of U.S. Provisional Application No. 62/289,678, filed Feb. 1, 2016, which is incorporated herein by reference.

TECHNICAL FIELD

The present invention relates to the field of horticultural irrigation apparatus and feeding systems, and more particularly, to a top feeding wicking apparatus and system for feeding or watering plants and the like.

BACKGROUND

Plants typically require feeding or watering or otherwise supplementing with liquid nutrition at least once weekly to survive. This may be accomplished by using a passive wicking system. A passive wicking system is a form of hydroponics that uses at least two or more wicks to transport nutrient solution or water from the reservoir into the growing medium and to the roots via capillary action such that plants are fed from the bottom up.

Various self-watering, plant feeding apparatus and systems incorporating wicking technology have been developed, but such apparatus and systems are not specifically designed for simple, convenient, and economical use due to their complex construction, and are not easily adaptable to an existing plant container or medium. It would thus be desirable to have an improved automated, top feeding wicking apparatus and system for feeding or watering plants and the like, which avoids the disadvantages of the known apparatus and systems.

SUMMARY

In a first aspect, there is provided herein a top feeding wicking apparatus for dispersing liquid through a plant growing medium. The apparatus includes a geometrically shaped container of variable size having a bottom, an inner wall, and an outer wall forming a channel therearound the container for receiving liquid therethrough. The container is configured with a center opening for receiving a plant. The bottom of the container is configured with at least one hole for receiving liquid therethrough. A geometrically shaped lid of variable size having a top, an inner wall, and an outer wall forming a channel therearound from an underside of the lid has a center opening for receiving the plant and is configured to be adjoined to the container. At least one nozzle is disposed on the top of the lid for receiving liquid from a hose. A geometrically shaped base layer and wicking layer of variable size each having an inner wall and an outer wall and a center opening for receiving the plant. The center opening of the base layer and the wicking layer each have a longitudinal opening extending therefrom to the outer wall to allow placement of the base layer and the wicking layer on the plant or to allow removal of the base layer and the wicking layer from the plant. The container with lid is configured to set atop the base layer and subsequent wicking layer such that liquid is dispersed through the plant growing medium.

In certain embodiments, the container and lid are geometrically shaped as a circle.

In certain embodiments, the container and lid are fabricated as one piece and molded from a single sheet of material.

In certain embodiments, the container and lid are C-shaped and include an opening for receiving a plant and removing the container and lid from the plant.

In certain embodiments, the container and lid are fabricated from plastic, rubber, metals, alloys, and the like.

In certain embodiments, the apparatus is fabricated from biodegradable materials.

In certain embodiments, the nozzle is configured to be barbed for securing the hose in place, pierced barbed for piercing a larger hose, or double-sided barbed (T-shaped) for allowing liquid to be delivered to more than one apparatus.

In certain embodiments, the container is configured with a plurality of geometrically shaped stakes of variable size extending therefrom the bottom for providing stability of the container within the plant growing medium.

In certain embodiments, a plurality of L-shaped notches are disposed on the bottom of the container for receiving the plurality of stakes.

In certain embodiments, the at least one hole of the bottom of the container includes raised walls on top for allowing even distribution of liquid through the at least one hole.

In certain embodiments, the at least one hole of the bottom of the container includes walls disposed beneath the at least one hole for concentrating exiting liquid via a pathway onto or into the base layer and the wicking layer.

In certain embodiments, the channel of the container includes at least one pathway for transporting liquid to the at least one hole of the bottom of the container.

In certain embodiments, the container and lid are adjoined together by ultra-sonic welding, a bonding agent, or a clip-on design.

In certain embodiments, the base layer is fabricated from an opaque material for blocking light from penetrating therethrough, controlling air flow, and for deterring pest infestation in the plant growing medium.

In certain embodiments, the base layer is fabricated from a poly-vinyl material or a vacuum formed or thermoformed plastic material.

In certain embodiments, the base layer and wicking layer are bonded together via a bonding agent.

In certain embodiments, the base layer is configured with a plurality of holes for delivering liquid onto or into the wicking layer.

In certain embodiments, the base layer is die-cut to allow the bottom of the container to be positioned directly onto the wicking layer.

In certain embodiments, a plurality of L-shaped notches are disposed on a top surface of at least one of the base layer and the wicking layer such that the container with lid is properly aligned on one or both of the base and wicking layers.

In certain embodiments, the wicking layer is fabricated from at least one of geo-textile cloth, cloth, foam, sponge, non-woven materials, woven materials, open-cell or closed-cell materials, and the like.

In a second aspect, there is provided herein a top feeding wicking apparatus for dispersing liquid through a plant growing medium using the apparatus disclosed above without the base layer. The container with lid is configured to set directly atop the wicking layer such that liquid may be dispersed through the plant growing medium.

In a third aspect, there is provided herein a top feeding wicking system for dispersing liquid through a plant growing medium using the apparatus disclosed above and herein. The top feeding wicking system includes an automated flow of liquid through the hose for dispersing liquid through the plant growing medium.

Various advantages of this disclosure will become apparent to those skilled in the art from the following detailed description, when read in light of the accompanying drawings.

DETAILED DESCRIPTION

Figure 1:
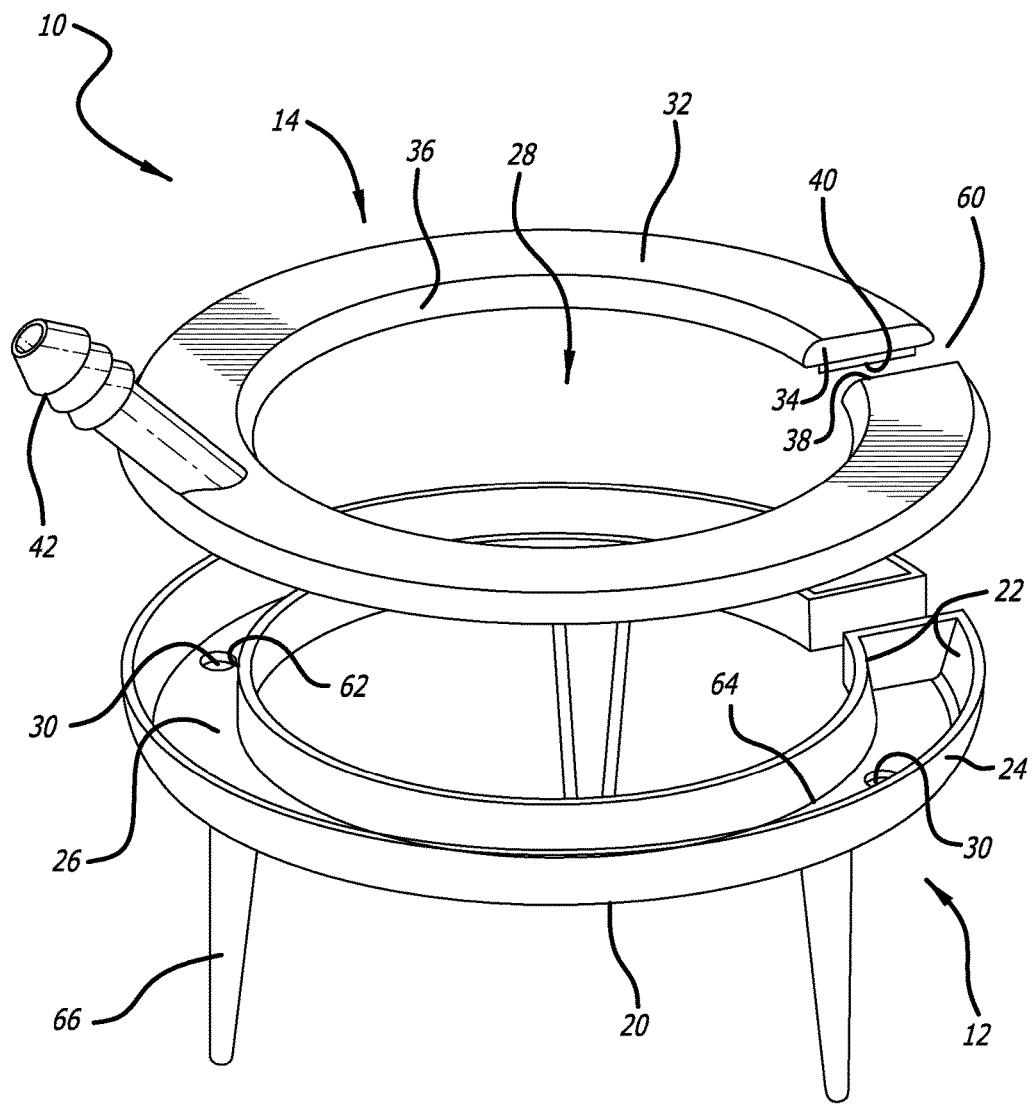
FIG. 1 is a top perspective view of an exemplary embodiment of the top feeding wicking apparatus fabricated into two parts and shown separate from the base layer and the wicking layer, according to the present disclosure.

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the disclosure is not limited to structures having the specific sizes or dimensions recited below. As used herein, the term "comprising" means "including, but not limited to."

In consideration of the figures, it is to be understood for purposes of clarity certain details of construction and/or operation are not provided in view of such details being conventional and well within the skill of the art upon disclosure of the document described herein.

The following terms and phrases shall have, for purposes of this application, the respective meanings set forth below:

The terms "feeding" and "watering" are used interchangeably herein and are intended to have the same meaning with respect to the treating of a plant with liquid nutrition so that the plant may grow and flourish.

The term "hydroponics" refers to the process of growing plants in sand, gravel, or liquid, with added nutrients, but without soil.

The term "irrigation" refers to the application of water to soil or another medium by artificial means to foster plant growth.

The terms "growing medium," "medium," or "media" refer to a liquid or solid in which organic structures such as plants are placed to grow.

The term "liquid" refers to any form of liquid nutrition for a plant, including water and the like.

The term "Rockwool" refers to the inorganic mineral based horticultural grade Rockwool primarily sold as a hydroponic substrate in the horticultural industry.

The phrase "substrate growing system" is a hydroponic system in which the root zone is physically supported by media and the plants are fed by applying nutrient solution to the media.

The terms "top feeding wicking apparatus" and "apparatus" are used interchangeably herein.

The top feeding wicking apparatus of the present disclosure pertains to an automated top feeding wicking apparatus and system that provides for an even and thorough distribution of water or other liquid nutrition onto a plant; prevents algae, mold, and weeds from growing in the plant growing medium by covering the medium in its entirety; deters pest infestations; retains moisture within the plant growing medium; promotes water conservation; low cost to manufacture; fabricated from inexpensive materials; provides a compact design for packing and shipping; durable; easy to assemble; and disposable or reusable, among other desirable features as described herein.

It is contemplated by the present disclosure that the top feeding wicking apparatus and system may be used with any suitable plant growing medium (e.g., Rockwool, soil, and the like) in a substrate growing system.

Figure 6:
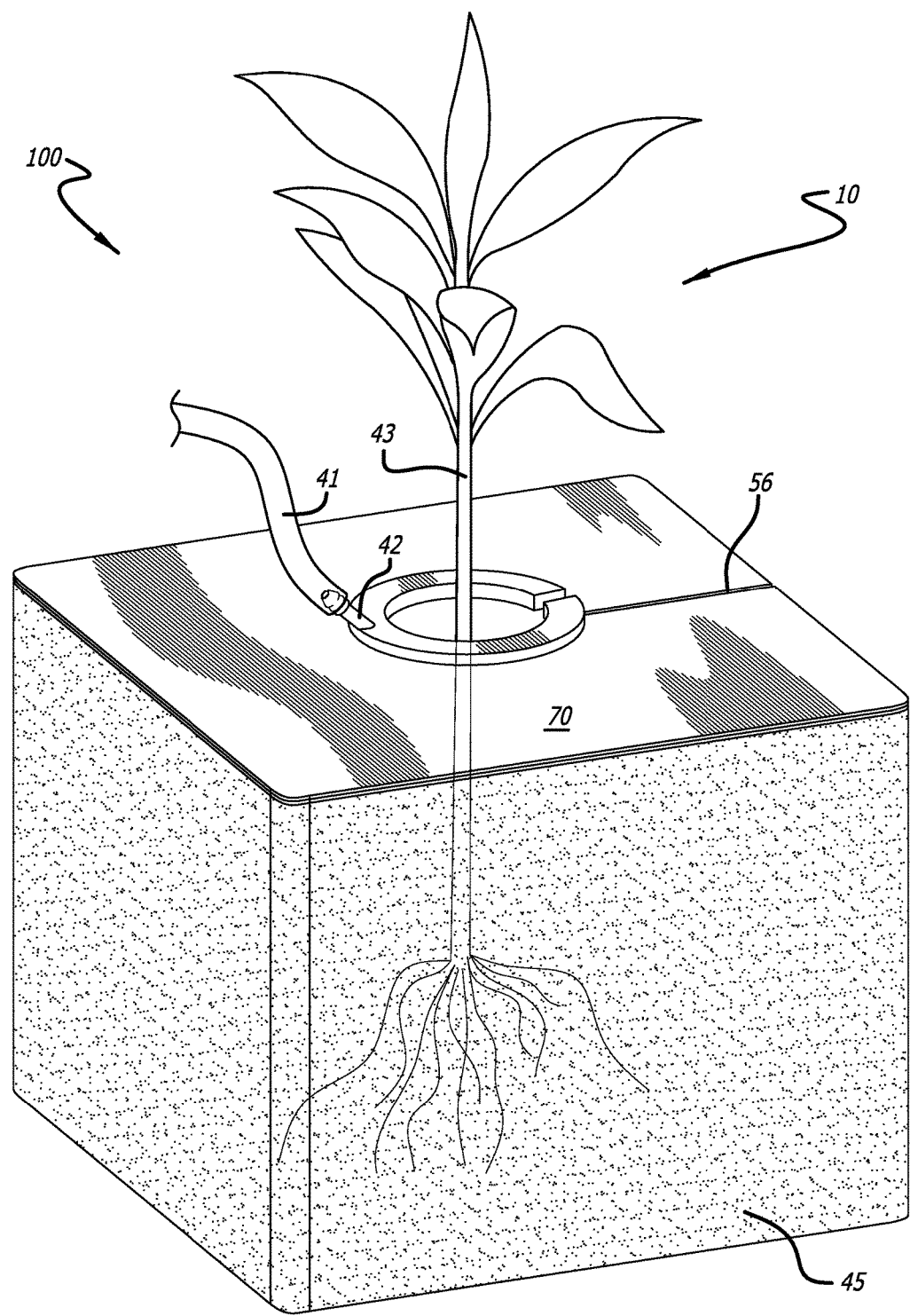
FIG. 6 is a top perspective view of the top feeding wicking apparatus and system of FIG. 4 shown in use and set atop the plant growing medium, according to the present disclosure.

Referring now to FIG. 1 is a top perspective view of an exemplary embodiment of the top feeding wicking apparatus 10 fabricated into two parts, i.e., container 12 and lid 14, and shown separate from the base layer 16 and the wicking layer 18, according to the present disclosure. The apparatus 10 includes a geometrically shaped container 12 of variable size having a bottom 20, an inner wall 22 and an outer wall 24 forming a channel 26 therearound the container for receiving liquid (not shown) therethrough. The bottom 20 of the container 12 is configured with at least one hole 30 for receiving liquid therethrough. A geometrically shaped lid 14 of variable size having a top 32, an inner wall 34 and an outer wall 36 forming a channel 38 therearound from an underside 40 of the lid is configured to be adjoined to the container 12. At least one nozzle 42 is disposed on the top 32 of the lid 14 for receiving liquid from a hose 41 (FIG. 6). The container 12 and lid 14 are configured with a center opening 28 for receiving a plant 43 (FIG. 6).

The apparatus 10 further includes a geometrically shaped base layer 16 and wicking layer 18 (FIG. 3) of variable size each having an inner wall 44, 46 and an outer wall 48, 50 are configured with a center opening 52, 54 for receiving the plant 43 (FIG. 6). The center opening 52, 54 of the base layer 16 and the wicking layer 18 each have a longitudinal opening 56, 58 extending therefrom to the outer wall 48, 50 to allow placement of the base layer 16 and the wicking layer 18 on the plant 43 or to allow removal of the base layer 16 and the wicking layer 18 from the plant 43. The container 12 with lid 14 is configured to set atop the base layer 16 and wicking layer 18 such that liquid may be dispersed through the plant growing medium 45 (FIG. 6).

In one embodiment, the container 12 and lid 14 are geometrically shaped as a circle as shown in FIGS. 1-5. It should be understood that the container 12 and lid 14 can be fabricated of any suitable geometric shape and size.

In another embodiment, the container 12 and lid 14 are fabricated as one piece and molded from a single sheet of material.

In other embodiments, the container 12 and lid 14 are fabricated from plastic, rubber, metals, alloys, and any other suitable sturdy material capable of retaining liquids (e.g., water).

In accordance with the present disclosure, the apparatus 10 can be fabricated to scale any size or shape plant growing medium. For example, the apparatus 10 can be fabricated to scale plant growing medium having the following dimensions: 4 inches×4 inches, 6 inches×6 inches, 8 inches×8 inches, and 9 inches×12 inches. It should be understood that the amount of volume the container 12 can hold will be according to scale such that a plant growing in a 4 inches×4 inches×4 inches Rockwool cube does not require the same amount of liquid nutrition as a plant in a five gallon pot.

In a further embodiment, the apparatus 10 is configured to be disposable after one or more uses or reusable after several prior uses.

In another embodiment, the apparatus 10 is fabricated from biodegradable materials, such as BioSphere plastic, synthetic biodegradable polymers, and any other suitable sturdy biodegradable material capable of retaining liquids (e.g., water).

In other embodiments, the nozzle 42 is configured to be barbed (FIG. 1) for receiving and securing the hose in place, pierced barbed (not shown) for piercing a larger hose, or double-sided barbed (not shown), i.e., T-shaped, for allowing liquid to be delivered to more than one apparatus 10. It should be understood that more than one nozzle 42 can be disposed on top 32 of the lid 14 for receiving liquid from the hose 41. The apparatus 10 can have one or more hoses 41 connected to each individual plant thereby allowing the user to regulate the uptake of liquids for each plant.

In one embodiment, the container 12 and lid 14 are C-shaped (FIG. 1) and include an opening 60 for receiving a plant 43 and removing the container 12 and lid 14 from the plant 43. It should be understood that the container 12 and lid 14 can be a closed circle without opening 60 to enable an even distribution of liquid therethrough the channel 26 of the container 12.

In accordance with the present disclosure, the at least one hole 30 of the bottom 20 of the container 12 includes raised walls 62 on top for allowing even distribution of liquid through the at least one hole 30. In other embodiments, the at least one hole 30 of the bottom 20 of the container 12 includes walls 63 disposed beneath the at least one hole 30 for concentrating exiting liquid via a pathway 64 onto or into the base layer 16 and the wicking layer 18. In other embodiments, the channel 26 of the container 12 includes at least one pathway 64 for transporting liquid to the at least one hole 30 of the bottom 20 of the container. It should be understood that there can be multiple pathways that are different from each other and allow for the efficient delivery of liquid to the at least one hole 30 of the bottom 20 of the container 12.

In a further embodiment, the container 12 and lid 14 are adjoined together by ultra-sonic welding, a bonding agent, or a clip-on design.

Figure 2:
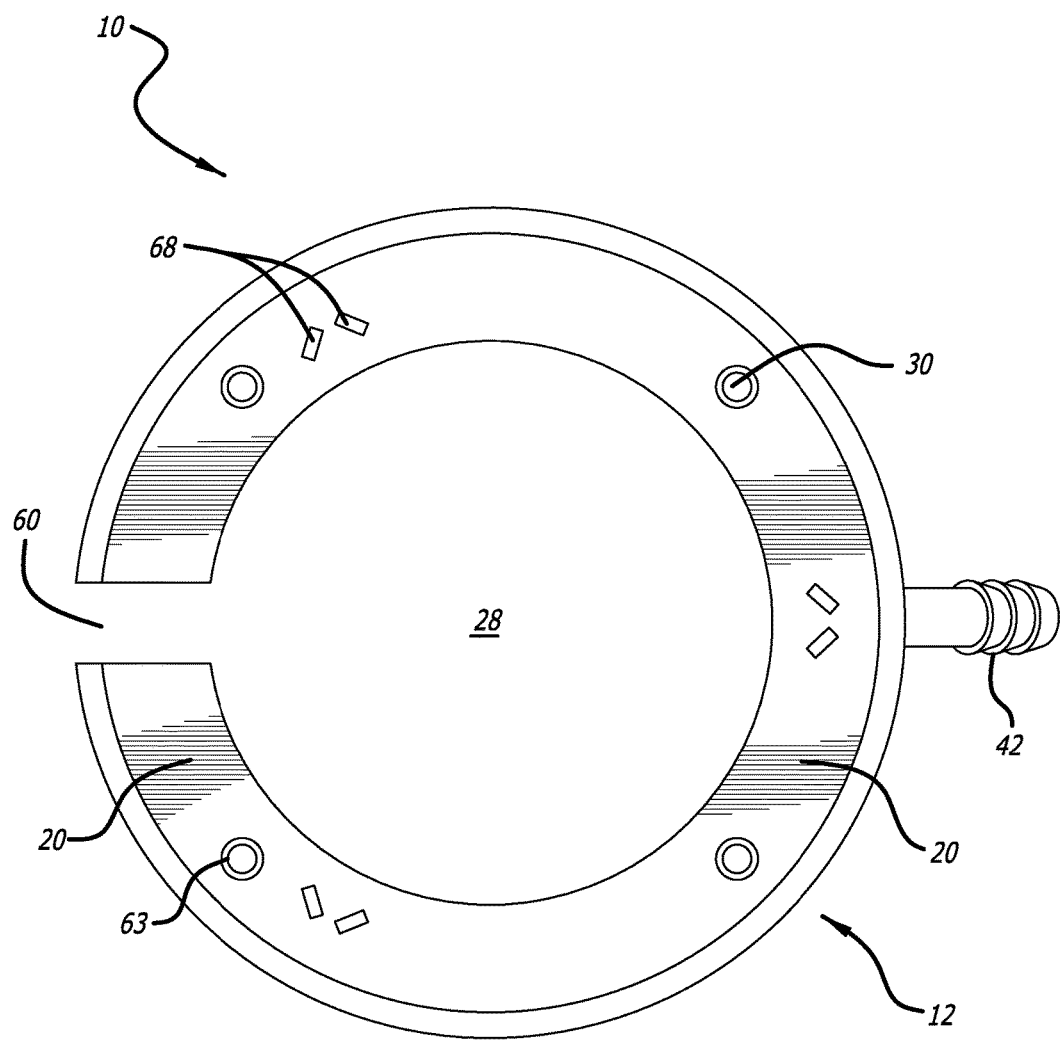
FIG. 2 is a bottom plan view of the top feeding wicking apparatus of FIG. 1 with the two parts attached together and shown with L-shaped notches for receiving longitudinal stakes, according to the present disclosure.

Referring now to FIG. 2 is a bottom plan view of the top feeding wicking apparatus 10 of FIG. 1 shown with the two parts, i.e., container 12 and lid 14, attached together, according to the present disclosure. In one embodiment, the container 12 is configured with a plurality of geometrically shaped stakes 66 (FIG. 1) of variable size extending therefrom the bottom 20 for providing stability of the container 12 within the plant growing medium 45 (FIG. 6). In another embodiment, a plurality of L-shaped notches 68 is disposed on the bottom 20 of the container 12 for receiving the plurality of stakes 66.

Figure 3:
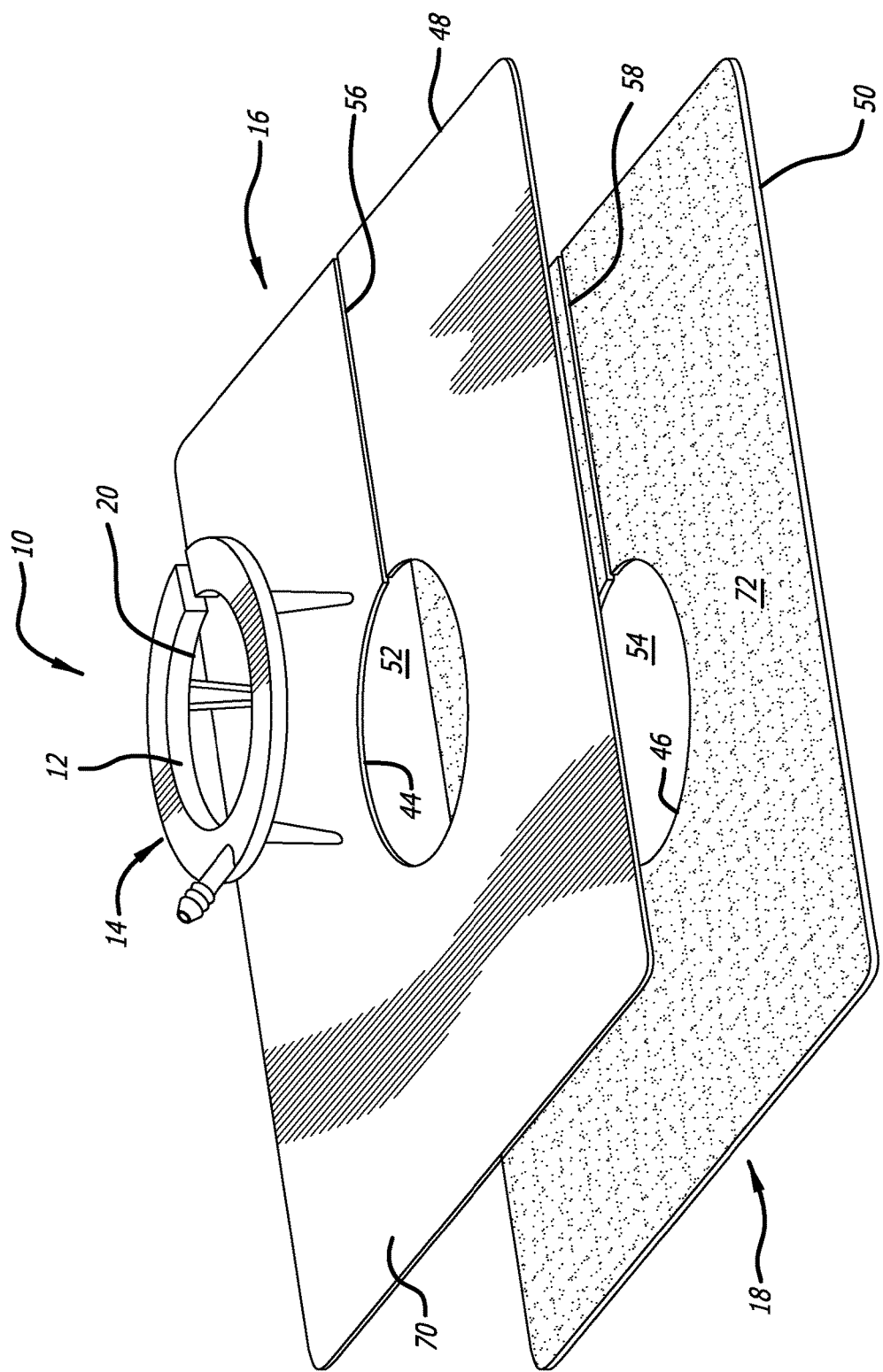
FIG. 3 is a top perspective view of an exemplary embodiment of the top feeding wicking apparatus of FIG. 1 shown detached from the base layer and the wicking layer, according to the present disclosure.

FIG. 3 is a top perspective view of an exemplary embodiment of the top feeding wicking apparatus 10 of FIG. 1 shown detached from the base layer 16 and the wicking layer 18, according to the present disclosure. In one embodiment, the base layer 16 is fabricated of an opaque material for blocking light from penetrating therethrough, controlling air flow, and for deterring pest infestation in the plant growing medium. By blocking light to the plant growing medium, the apparatus 10 prevents the growth of algae, mold, and weeds in the plant growing medium. In other embodiments, the base layer 16 is fabricated of a poly-vinyl material or a vacuum formed or thermoformed plastic material. It should be understood that the base layer 16 can be fabricated of any suitable geometric shape and size.

In another embodiment, the base layer 16 and wicking layer 18 are bonded together via a bonding agent. It should be understood that the base layer 16 can be disposed on top of the wicking layer 18 without any bonding of the two layers.

In one embodiment, the wicking layer 18 is fabricated of at least one of a geo-textile cloth, cloth, foam, sponge, non-woven materials, woven materials, open-cell or closed-cell materials, and the like. The wicking layer materials allow liquid to travel throughout and provide efficient delivery to the entirety of the wicking layer 18 such that liquid or nutrients are ultimately delivered to the top of the plant growing medium. It should be understood that the wicking layer 18 may be fabricated of any suitable geometric shape and size.

Figure 4:
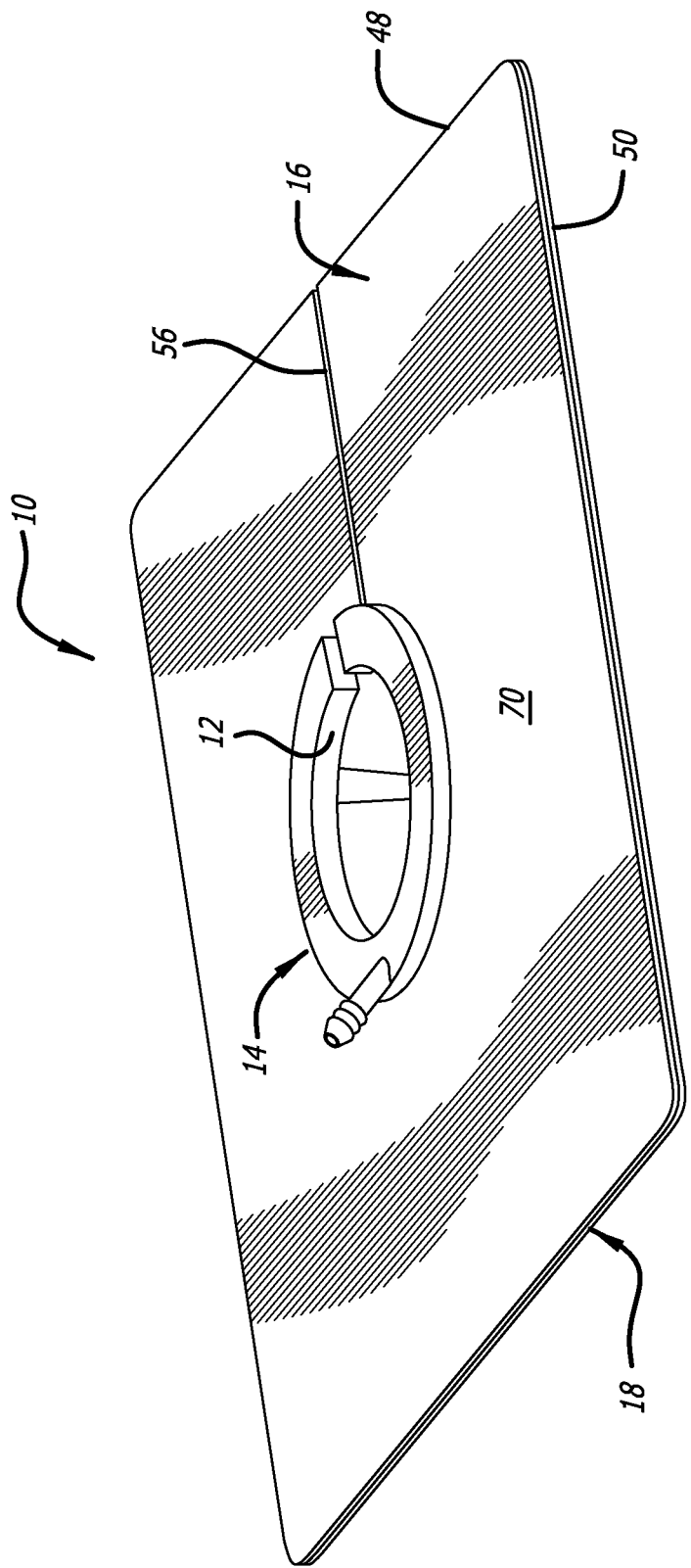
FIG. 4 is a top perspective view of an exemplary embodiment of the top feeding wicking apparatus of FIG. 1 shown attached to the base layer and the wicking layer, according to the present disclosure.

FIG. 4 is a top perspective view of an exemplary embodiment of the top feeding wicking apparatus 10 of FIG. 1 shown attached to the base layer 16 and the wicking layer 18, according to the present disclosure. In one embodiment, the base layer 16 is die-cut to allow the bottom 20 of the container 12 to be positioned directly onto the wicking layer 18 such that the base layer covers the wicking layer 18 only from the outside diameter of the container 12 to the outer wall 48 perimeter of the base layer 16 as shown in FIG. 4.

In accordance with the present disclosure, there is also provided herein a top feeding wicking apparatus 10 for dispersing liquid through a plant growing medium using the apparatus 10 disclosed above without the base layer 16. In this embodiment, the container 12 with lid 14 is configured to set directly atop the wicking layer 18 such that liquid may be dispersed through the plant growing medium 45.

Figure 5:
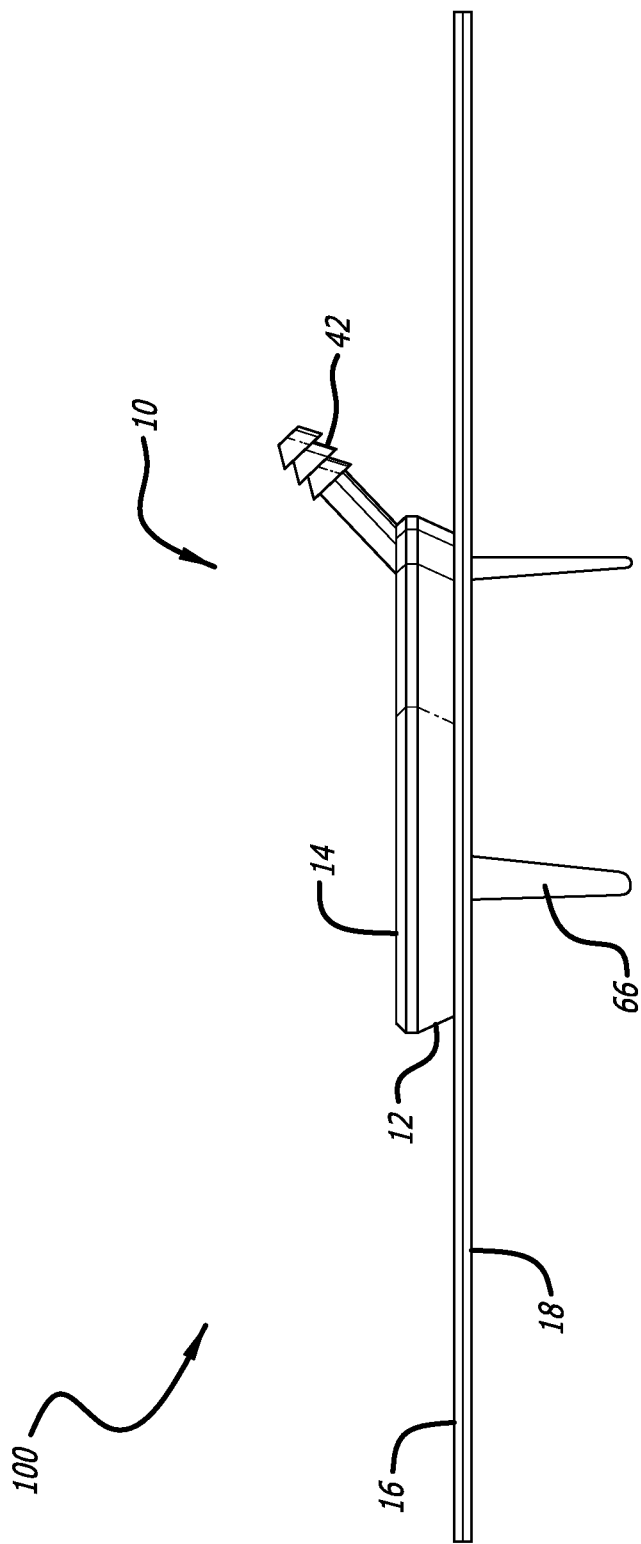
FIG. 5 is a side elevational view of an exemplary embodiment of the top feeding wicking apparatus and system, according to the present disclosure.

In accordance with the present disclosure, there is further provided herein a top feeding wicking system 100 for dispersing liquid through a plant growing medium using the apparatus 10 disclosed above. It should be understood that the apparatus 10 can receive water manually poured in by the user (without the lid 14 with nozzle 42 feature) or be used in conjunction with an automated top feeding wicking system 100 with a hose 41 feature such that an automated flow of liquid is directed through the hose 41 for dispersing liquid through the plant growing medium. FIG. 5 is a side elevational view of an exemplary embodiment of the top feeding wicking apparatus 10 and system 100 (shown without the hose set up and placement in the plant growing medium), according to the present disclosure.

FIG. 6 is a top perspective view of the top feeding wicking apparatus 10 and system 100 of FIG. 4 shown in use and set atop the plant growing medium 45, according to the present disclosure.

Figure 7:
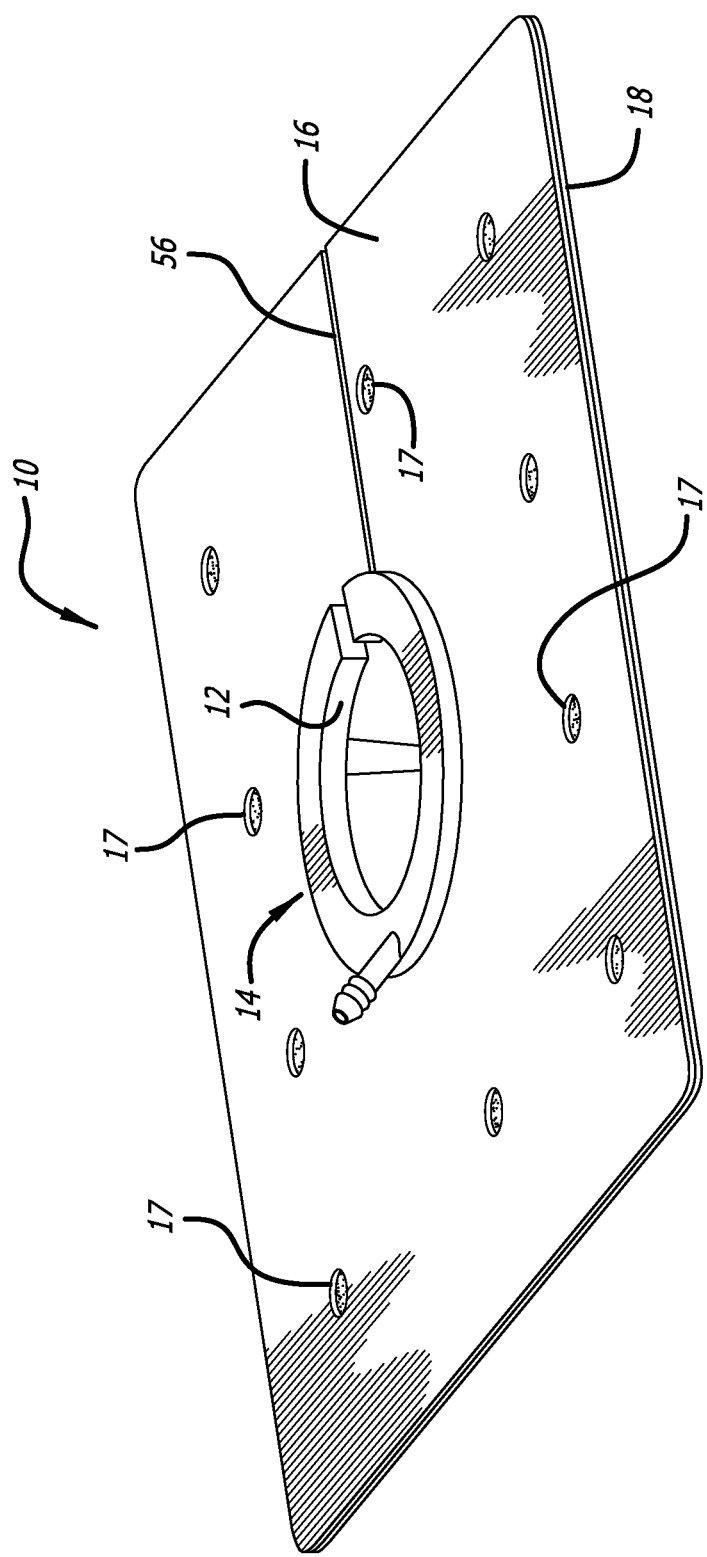
FIG. 7 is an enlarged top perspective view of another exemplary embodiment of the top feeding wicking apparatus and system in which the base layer is configured with a plurality of holes, according to the present disclosure.

FIG. 7 is an enlarged top perspective view of another exemplary embodiment of the top feeding wicking apparatus 10 and system 100 in which the base layer 16 is configured with a plurality of holes 17 for delivering liquid onto or into the wicking layer 18.

Figure 8:
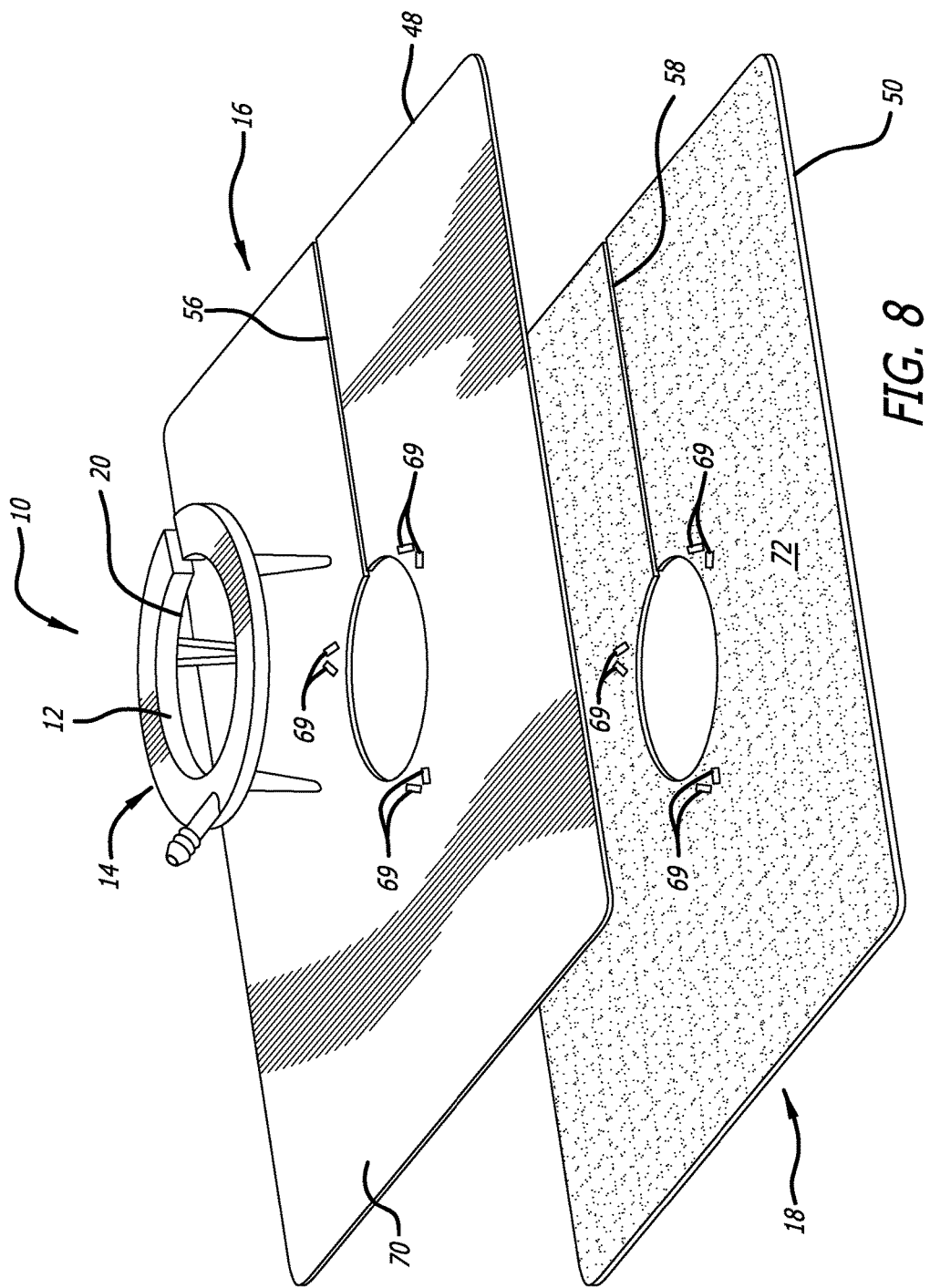
FIG. 8 is an enlarged top perspective view of another exemplary embodiment of the top feeding wicking apparatus of FIG. 1 shown detached from the base layer and the wicking layer in which the base layer and the wicking layer are shown with a plurality of L-shaped notches, according to the present disclosure.

FIG. 8 is an enlarged top perspective view of another exemplary embodiment of the top feeding wicking apparatus 10 of FIG. 1 shown detached from the base layer 16 and the wicking layer 18. A plurality of L-shaped notches 69 are disposed on a top surface 70, 72 of the base layer 16 and/or wicking layer 18 such that the container 12 with lid 14 is properly aligned on one or both of the base and the wicking layers 16, 18.

Several of the features and functions disclosed above may be combined into different systems or applications, or combinations of systems and applications. Various presently unforeseen or unanticipated alternatives, modifications, variations or improvements therein may be subsequently made by those skilled in the art, each of which are also intended to be encompassed by the following claims.

What is claimed is:

1. A top feeding wicking apparatus for dispersing liquid through a plant growing medium, comprising:
    a geometrically shaped container of variable size having a bottom, an inner wall, and an outer wall forming a channel therearound the container for receiving liquid therethrough, the container having a center opening for receiving a plant and the bottom of the container having at least one hole for receiving liquid therethrough;
    a geometrically shaped lid of variable size having a top, an inner wall, and an outer wall forming a channel therearound from an underside of the lid, the lid having a center opening for receiving the plant and configured to be adjoined to the container, wherein at least one nozzle is disposed on the top of the lid for receiving liquid from a hose; and
    a geometrically shaped base layer and wicking layer of variable size each having an inner wall and an outer wall and a center opening for receiving the plant, the center opening of the base layer and the wicking layer each having a longitudinal opening extending therefrom to the outer wall to allow placement of the base layer and the wicking layer on the plant or to allow removal of the base layer and the wicking layer from the plant; and
    a plurality of geometrically shaped stakes of variable size extending therefrom the bottom of the container for providing stability of the container within the plant growing medium;
    wherein the container with the geometrically shaped lid is configured to set atop the base layer and the wicking layer such that liquid is dispersed through the plant growing medium and the base layer is configured to set atop the wicking layer;
    wherein the container with the geometrically shaped lid is arranged on the center openings of the geometrically shaped base layer and wicking layer and the geometrically shaped stakes pass through the center openings of the geometrically shaped base layer and wicking layer;
    wherein each of the container with the geometrically shaped lid, the base layer, and the wicking layer is a separate piece.

2. The apparatus of claim 1, wherein the container and lid are geometrically shaped as a circle.

3. The apparatus of claim 1, wherein the container and lid are fabricated as one piece and molded from a single sheet of material.

4. The apparatus of claim 1, wherein the container and lid are C-shaped, wherein each of the container and lid comprises an opening for receiving a plant and removing the container and the lid from the plant.

5. The apparatus of claim 1, wherein the container and lid are fabricated from at least one of plastic, rubber, metals, and alloys.

6. The apparatus of claim 1, wherein the apparatus is fabricated from biodegradable materials.

7. The apparatus of claim 1, wherein the nozzle is configured to be barbed for securing the hose in place.

8. The apparatus of claim 7, wherein a plurality of L-shaped notches are disposed on the bottom of the container for receiving the plurality of stakes.

9. The apparatus of claim 1, wherein the at least one hole of the bottom of the container includes raised walls on top for allowing even distribution of liquid through the at least one hole.

10. The apparatus of claim 1, wherein the at least one hole of the bottom of the container includes walls disposed beneath the at least one hole for concentrating exiting liquid via a pathway onto or into the base layer and the wicking layer.

11. The apparatus of claim 1, wherein the channel of the container includes at least one pathway for transporting liquid to the at least one hole of the bottom of the container.

12. The apparatus of claim 1, wherein the container and lid are adjoined together by ultra-sonic welding, a bonding agent, or a clip-on design.

13. The apparatus of claim 1, wherein the base layer is fabricated from an opaque material for blocking light from penetrating therethrough, controlling air flow, and for deterring pest infestation in the plant growing medium.

14. The apparatus of claim 1, wherein the base layer is fabricated from a poly-vinyl material or a vacuum formed or thermoformed plastic material.

15. The apparatus of claim 1, wherein the base layer and wicking layer are bonded together via a bonding agent.

16. The apparatus of claim 1, wherein the base layer is configured with a plurality of holes for delivering liquid onto or into the wicking layer.

17. The apparatus of claim 1, wherein a plurality of L-shaped notches are disposed on a top surface of at least one of the base layer and the wicking layer such that the container with lid is properly aligned on one or both of the base and wicking layers.

18. The apparatus of claim 1, wherein the wicking layer is fabricated from at least one of geo-textile cloth, cloth, foam, sponge, non-woven materials, woven materials, open-cell and closed-cell materials.

19. A top feeding wicking apparatus for dispersing liquid through a plant growing medium, comprising:
    a geometrically shaped container of variable size having a bottom, an inner wall, and an outer wall forming a channel therearound the container for receiving liquid therethrough, the container having a center opening for receiving a plant and the bottom of the container having at least one hole for receiving liquid therethrough;

a geometrically shaped lid of variable size having a top, an inner wall, and an outer wall forming a channel therearound from an underside of the lid, the lid having a center opening for receiving the plant and configured to be adjoined to the container, wherein at least one nozzle is disposed on the top of the lid for receiving liquid from a hose; and a geometrically shaped wicking layer of variable size having an inner wall and an outer wall and a center opening for receiving the plant, the center opening of the wicking layer having a longitudinal opening extending therefrom to the outer wall to allow placement of the wicking layer on the plant or to allow removal of the wicking layer from the plant; and a plurality of geometrically shaped stakes of variable size extending therefrom the bottom of the container for providing stability of the container within the plant growing medium;

wherein the container with the geometrically shaped lid is configured to set atop the wicking layer such that liquid is dispersed through the plant growing medium, and the base layer is configured to set atop the wicking layer;

wherein the container with the geometrically shaped lid is arranged on the center openings of the geometrically shaped base layer and wicking layer and the geometrically shaped stakes pass through the center openings of the geometrically shaped base layer and wicking layer;

wherein each of the container with the geometrically shaped lid, the base layer, and the wicking layer is a separate piece.

20. A top feeding wicking system for dispersing liquid through a plant growing medium, comprising:

a top feeding wicking apparatus, comprising:

a geometrically shaped container of variable size having a bottom, an inner wall, and an outer wall forming a channel therearound the container for receiving liquid therethrough, the container having a center opening for receiving a plant and the bottom of the container having at least one hole for receiving liquid therethrough;

a geometrically shaped lid of variable size having a top, an inner wall, and an outer wall forming a channel therearound from an underside of the lid, the lid having a center opening for receiving the plant and configured to be adjoined to the container, wherein at least one nozzle is disposed on the top of the lid for receiving liquid from a hose; and a geometrically shaped base layer and wicking layer of variable size each having an inner wall and an outer wall and a center opening for receiving the plant, the center opening of the base layer and the wicking layer each having a longitudinal opening extending therefrom to the outer wall to allow placement of the base layer and the wicking layer on the plant or to allow removal of the base layer and the wicking layer from the plant; and a plurality of geometrically shaped stakes of variable size extending therefrom the bottom of the container for providing stability of the container within the plant growing medium;

wherein the container with the geometrically shaped lid is configured to set atop the base layer and the wicking layer such that liquid is dispersed through the plant growing medium, and the base layer is configured to set atop the wicking layer;

wherein the container with the geometrically shaped lid is arranged on the center openings of the geometrically shaped base layer and wicking layer and the geometrically shaped stakes pass through the center openings of the geometrically shaped base layer and wicking layer;

wherein each of the container with the geometrically shaped lid, the base layer, and the wicking layer is a separate piece; and an automated flow of liquid through the hose for dispersing liquid through the plant growing medium.

\* \* \* \* \*